June 1, 1937.   A. LE TARTE   2,082,348
CLOSET MOUNTING
Filed Feb. 16, 1935
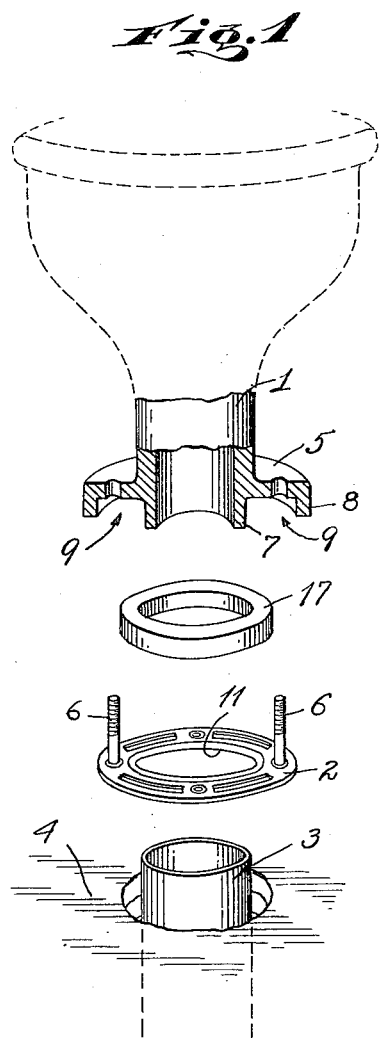
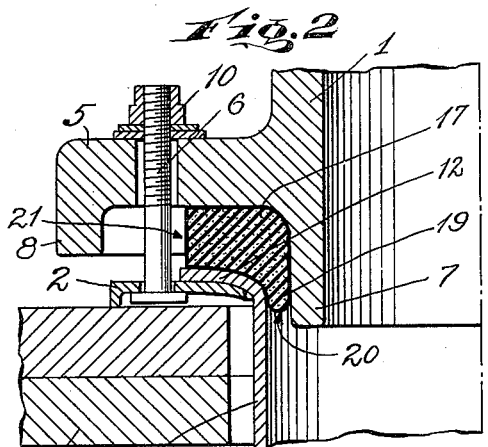
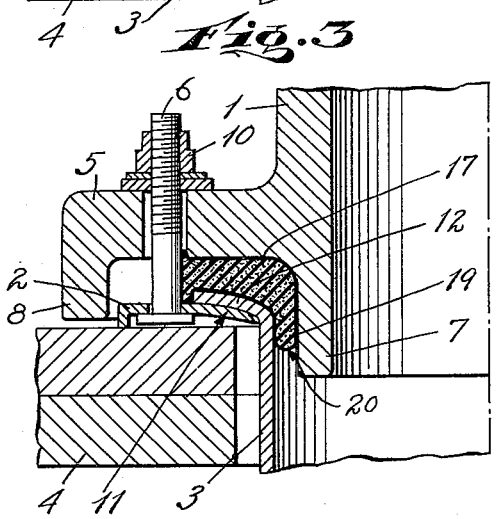
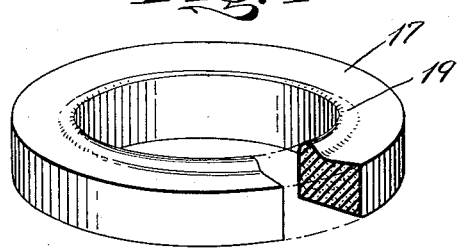
INVENTOR
Alexandre Le Tarte
BY
ATTORNEYs.

Patented June 1, 1937

2,082,348

UNITED STATES PATENT OFFICE 2,082,348

CLOSET MOUNTING

Alexander Le Tarte, Bryn Mawr, N. Y., assignor to Crest Mfg. Co., Inc., a corporation of New York Application February 16, 1935, Serial No. 6,794

3 Claims. (Cl. 285—34)

My invention relates to sealing the joint between closet bowls and their soil pipes where, as is well known, a gas and moisture tight joint must be made against a rough and irregular soil pipe end or against a rough-surfaced floor flange attached to the soil pipe or the like.

Generally speaking, it provides a closet bowl seal that is less costly in materials and/or labor than prior seals, that is little if at all likely to cause breakage of bowl flanges when drawing down on the holding bolts, and that is dependable and permanent in that it does not tend in time to shrink, dry out and crack as do the seals previously employed; also it maintains the joint tight despite settling of the floor or rocking of the bowl, and is entirely free of the faults peculiar to the customary plaster and putty seals, that is to say, the possibility that some of the sealing material may fall out of the recess in the bowl base as the bowl is being uprighted onto the flange and soil pipe end and some may be squeezed out of the joint in drawing the bowl down to the floor.

I have found that these results can be secured by using between the bowl and the soil pipe, a gasket of sponge rubber such as hereafter described.

The preferred form of my invention as applied to a customary mode of bowl setting, is illustrated in the accompanying drawing. Fig. 1 shows an assembly of closet bowl, gasket, floor flange and soil pipe of my invention, the parts being shown separated however in order that each may be represented clearly. Fig. 2 is a vertical section at one side of an installation showing the relation of the parts when the bowl is little if any drawn down toward the soil pipe and floor flange. Fig. 3 is a similar section but showing the parts in their preferred final positions. Fig. 4 is a perspective view, partly in section, of the preferred form of gasket of my invention, the bottom of the gasket being shown upwardly however in order to display the bead.

The closet bowl 1, floor flange 2, and soil-pipe-end 3 projecting upwardly through the floor 4, may all be in accordance with standard practice. The bowl can be assumed to contain the usual water trap (not shown), and as usual may have a horizontal flange 5 to receive the holding-down bolts 6 which rise from the floor flange 2, a downwardly projecting horn or pipe end 7 to extend into the soil pipe 3 (and externally perhaps considerably smaller than the internal diameter of the soil pipe, Figs. 2 and 3), and a lip 8 on the horizontal flange 5 to complete a more or less annular recess 9 outside the horn to receive the sealing material sealing the bowl to, say, the soil pipe. In setting, nuts 10 on the bolts 6 are employed usually to draw the bowl down toward the floor. Also in accordance with a common practice, the upper side of the floor flange 2 may be beveled as at 11, and the flange may be bolted to the floor; and the extreme upper end of the soil pipe (which usually is of lead) may be peened or otherwise expanded or flanged over onto the bevel as shown at 12. As indicated before, the foregoing practice with respect to the floor flange and soil pipe is not always followed, but the practice illustrated is sufficiently representative for the present purposes; it is to be understood that my invention is not limited to the practice illustrated.

In accordance with my invention I employ, to seal the joint between the bowl and the soil pipe, a preferably endless annular sponge rubber gasket 17, preferably of the form shown inverted in Fig. 4. As here illustrated, I preferably make substantially the entire gasket of sponge rubber. Primarily the gasket consists of an annular body portion, preferably substantially rectangular in shape, to lie horizontally between the bowl flange 5 and (in the present instance) the flange 12 of the soil pipe. Preferably an integral annular bead 19 is provided at the lower inner corner of the gasket (Fig. 4) to extend around the corner of the soil pipe flange 12 and downwardly for some distance along the bowl horn and between the bowl horn and the cylindrical wall of the soil pipe (Figs. 2 and 3), this helping to guide the bowl horn to a central position with respect to the soil pipe when setting the bowl, and also somewhat increasing the sealing area. The internal diameter of the gasket may be about equal to the external diameter of the horn, so that the gasket can be slipped into place on the horn readily and hold itself in place on the horn as the bowl is placed on the soil pipe; the external diameter may be less than the diameter of the closet bowl flange 5 (particularly so that it can rest within a bowl recess 9 and in any event not project too much beyond the flange when compressed), and usually I make the external diameter of the gasket such that the gasket will pass inside the holding-down bolts (Figs. 1 and 2). The external diameter of the bead 19 may approximate the internal diameter of the soil pipe so that the bead will enter the soil pipe readily or be pushed into the soil pipe as the bowl is set down.

Generally speaking, the thickness (vertical dimension) of the body portion of the gasket and its porosity or "blow" are correlated. I give the rubber such a degree of porosity or blow (at least adjacent its lower surface where it engages the soil pipe) that its lower surface is soft enough to enter at least the broader and longer of the indentations that the peening of the soil pipe leaves usually on the soil pipe flange; the greater the porosity or blow the greater is the softness. At the same time I give the porous mass such a vertical dimension (and hence mass or volume) that at least when the bowl is drawn down by turning the nuts 10 on their bolts 6 the pressure of the gasket body 17 on the soil pipe flange is fairly uniformly distributed over the whole lower surface of the gasket, so that the gasket makes gas-and-water-tight contact with the bottoms and sides of at least the broader and longer sides of the indentations in the soil pipe, as well as with the tops of the points and ridges on the soil pipe flange. Accordingly the connection between the gasket and soil pipe is sealed throughout the whole circumference. Similar, or even less porosity or less mass of porous rubber at the upper gasket surface will effectively seal against the smoother under surface of the bowl flange 5. Therefore the whole of the gasket may be, and preferably is, made of sponge rubber of substantially the same porosity, except for the outer skin mentioned again below. In addition to the foregoing the thickness of the gasket is such and the texture is such or the porosity or blow is of such a low degree (and hence the gasket is so resistant to compacting) that the gasket can hold the bowl elevated somewhat off the floor initially before being drawn down by the bolts (Fig. 2), and preferably the vertical dimension and the indicated porosity or blow are so correlated that the porosity continues during (in the sense that the cells are not closed by) the drawing down of the bowl to the floor 4 (somewhat below the position of Fig. 3), and at the same time the resistance of the gasket to compacting is so low that the force required at the bolts in drawing the bowl down to the floor is less than the force required to break the bowl flange 5. As a result of the last the setter can not break the bowl in drawing it down unless he continues turning the nuts 10 after the bowl lip 8 strikes the floor. In lowering the bowl and compressing the gasket described a tight and permanent seal is formed. Sponge rubber is of course resilient, and hence expands when pressure on it is removed. Accordingly the joint once being sealed by the gasket 17, the gasket, so long as it continues resilient, keeps the joint tight despite any subsequent shifting of the bowl with respect to the soil pipe, such as may occur by the settling of the floor or rocking of the bowl. As before indicated a sponge of good quality rubber has a life or resiliency that in effect is permanent for the present purposes. By leaving the bowl with its lip 8 slightly off the floor (Fig. 3), liability to breakage of the bowl subsequent to installation is somewhat reduced, since this permits some harmless shifting due to the resiliency of the gasket.

Sponge rubber having integral unbroken walls between cells is of course a non-conductor of gas and moisture even when not compressed. The sponge rubber of my gasket may be and desirably is such sponge rubber, the walls of the cells then being of such thickness as not to be broken but to substantially retain their integrity and the gas within the individual cells as the gasket is compressed by the drawing down of the bowl by the bolts 6. To further proof the gasket to gas and moisture however I preferably leave or provide a thin skin of non-sponge or solid rubber, or the like on, at least, one or both the exposed edges of the gasket as before pointed out; i. e. on the edge 20 or the edge 21 in Fig. 2, or both. Preferably I provide such a thin skin on all surfaces of the gasket, as I have represented by the rather heavy line outlining the gasket sections in Figs. 2, 3 and 4.

As before indicated, the foregoing illustrates the application of my invention to the customary bowl-setting practice. In some localities somewhat different practices are followed; for example, the floor flange may be placed above and tightly fastened to the end of the soil pipe; in such a case the seal is formed between the bowl and the floor flange which then can be regarded as the end of the soil pipe so far as the present matter is concerned. My invention is applicable to such and analogous variations in the practice described above, as is obvious, and it is to be understood that the claims hereinafter include such variations in bowl-setting practices. In general too, my invention is not limited to the details of construction illustrated and described above except as appears hereinafter in the claims.

I claim:

1. In a toilet closet bowl installation having a soil pipe and a closet bowl having a flange and horn, means to seal those parts comprising a ring of sponge rubber having an internal diameter adapted to be slipped over said horn and an external diameter less than the closet bowl flange, said ring having a thickness and texture adapted to initially support the bowl off the floor but effective under pressure exerted by the bowl attaching means to constitute a non-porous seal against escape of gas and moisture.

2. As an article of manufacture, a gasket to seal the connection between a closet bowl and a soil pipe comprising a ring composed substantially of sponge rubber and having such an internal diameter that it can be slipped over the horn of a closet bowl, the walls of the cells being of such thickness as to substantially retain their integrity and the gas within the individual cells, and said gasket being of sufficient thickness to support the weight of the bowl off the floor prior to the bowl being drawn down to the floor.

3. The subject matter of claim 2, characterized by the fact that at least the surfaces of the gasket that are exposed when the gasket is in place between the closet bowl and the soil pipe, consists of a skin of substantially non-sponge rubber.

ALEXANDER LE TARTE.